US010296879B2

(12) United States Patent
Farrugia et al.

(10) Patent No.: US 10,296,879 B2
(45) Date of Patent: *May 21, 2019

(54) USE OF MEDIA STORAGE STRUCTURE WITH MULTIPLE PIECES OF CONTENT IN A CONTENT-DISTRIBUTION SYSTEM

(75) Inventors: Augustin J. Farrugia, Cupertino, CA (US); Thomas Dowdy, Sunnyvale, CA (US); Gianpaolo Fasoli, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 852 days.

This patent is subject to a terminal disclaimer.

(21) Appl. No.: 13/612,766

(22) Filed: Sep. 12, 2012

(65) Prior Publication Data

US 2013/0066785 A1 Mar. 14, 2013

Related U.S. Application Data

(63) Continuation of application No. 11/249,123, filed on Oct. 11, 2005, now Pat. No. 8,306,918.

(51) Int. Cl.
*G06F 21/10* (2013.01)
*G06Q 20/12* (2012.01)
(Continued)

(52) U.S. Cl.
CPC ......... *G06Q 20/1235* (2013.01); *G06F 21/10* (2013.01); *G06F 21/6218* (2013.01); *H04N 21/00* (2013.01); *G06Q 2220/12* (2013.01)

(58) Field of Classification Search
USPC .......................................................... 705/51
See application file for complete search history.

(56) References Cited

U.S. PATENT DOCUMENTS 5,103,476 A 4/1992 Waite et al.
5,638,443 A 6/1997 Stefik et al.
(Continued)

FOREIGN PATENT DOCUMENTS

AU 2006302090 4/2007
AU 2010201178 4/2010
(Continued)

OTHER PUBLICATIONS

Ltd., O. M. (Jul. 16, 2004). DRM Specification. Candidate Version 2.0.*
(Continued)

*Primary Examiner* — Zeshan Qayyum
*Assistant Examiner* — El Mehdi Oussir
(74) *Attorney, Agent, or Firm* — Morgan, Lewis & Bockius LLP

(57) ABSTRACT

A method for distributing content. The method distributes a single media storage structure to a device (e.g., a computer, portable player, etc.). The media storage structure includes first and second pieces of encrypted content. Based on whether the device is allowed to access the first piece of content, the second piece of content, or both, the method provides the device with a set of keys for decrypting the pieces of the content that the device is able to access. The provided set of keys might include one or more keys for decrypting only one of the two encrypted pieces of content. Alternatively, it might include one or more keys for decrypting both encrypted pieces of content. For instance, the selected set of keys might include a first key for decrypting the first encrypted piece and a second key for decrypting the second encrypted piece.

20 Claims, 10 Drawing Sheets

(51) Int. Cl.
  *H04N 21/00*     (2011.01)
  *G06F 21/62*     (2013.01)

(56) References Cited

U.S. PATENT DOCUMENTS

| | | | |
|---|---|---|---|
| 5,673,316 A * | 9/1997 | Auerbach | G07F 7/08 |
| | | | 705/51 |
| 5,892,900 A * | 4/1999 | Ginter | G06F 21/10 |
| | | | 726/26 |
| 5,933,497 A | 8/1999 | Beetcher et al. | |
| 5,963,909 A | 10/1999 | Warren | |
| 5,982,891 A | 11/1999 | Ginter et al. | |
| 6,076,077 A | 6/2000 | Saito | |
| 6,226,618 B1 * | 5/2001 | Downs | G06F 21/10 |
| | | | 380/279 |
| 6,263,348 B1 | 7/2001 | Kathrow et al. | |
| 6,314,418 B1 | 11/2001 | Namba | |
| 6,385,596 B1 | 5/2002 | Wiser et al. | |
| 6,427,140 B1 | 7/2002 | Ginter et al. | |
| 6,507,727 B1 | 1/2003 | Henrick | |
| 6,675,215 B1 * | 1/2004 | Cedola | 709/227 |
| 6,715,050 B2 | 3/2004 | Williams et al. | |
| 6,772,340 B1 | 8/2004 | Peinado et al. | |
| 6,865,555 B2 | 3/2005 | Novak | |
| 6,886,098 B1 | 4/2005 | Benaloh | |
| 6,910,022 B2 | 6/2005 | Stefik et al. | |
| 6,948,070 B1 | 9/2005 | Ginter et al. | |
| 6,980,972 B1 | 12/2005 | Allibhoy et al. | |
| 6,983,262 B1 | 1/2006 | Ito | |
| 6,986,043 B2 | 1/2006 | Andrew et al. | |
| 6,986,046 B1 | 1/2006 | Tuvell et al. | |
| 6,993,137 B2 | 1/2006 | Fransdonk | |
| 6,999,587 B1 | 2/2006 | Asano et al. | |
| 7,007,170 B2 | 2/2006 | Morten | |
| 7,016,498 B2 | 3/2006 | Peinado et al. | |
| 7,017,188 B1 | 3/2006 | Schmeidler et al. | |
| 7,054,841 B1 | 5/2006 | Tenorio | |
| 7,058,809 B2 | 6/2006 | White et al. | |
| 7,073,073 B1 | 7/2006 | Nonaka et al. | |
| 7,080,037 B2 | 7/2006 | Burger et al. | |
| 7,108,171 B1 | 9/2006 | Ergo et al. | |
| 7,110,984 B1 | 9/2006 | Spagna et al. | |
| 7,124,302 B2 | 10/2006 | Ginter et al. | |
| 7,133,845 B1 | 11/2006 | Ginter et al. | |
| 7,162,451 B2 | 1/2007 | Berger et al. | |
| 7,170,999 B1 | 1/2007 | Kessler et al. | |
| 7,203,966 B2 | 4/2007 | Abburi et al. | |
| 7,213,005 B2 | 5/2007 | Mourad et al. | |
| 7,237,268 B2 | 6/2007 | Fields | |
| 7,249,264 B2 | 7/2007 | Belknap et al. | |
| 7,254,837 B2 | 8/2007 | Fields | |
| 7,290,285 B2 | 10/2007 | McCurdy et al. | |
| 7,299,498 B2 | 11/2007 | Lee et al. | |
| 7,313,814 B2 | 12/2007 | Zhu et al. | |
| 7,316,033 B2 | 1/2008 | Risan et al. | |
| 7,340,055 B2 | 3/2008 | Hori et al. | |
| 7,350,238 B2 | 3/2008 | Abe et al. | |
| 7,353,209 B1 | 4/2008 | Peinado et al. | |
| 7,386,512 B1 | 6/2008 | Allibhoy et al. | |
| 7,389,273 B2 | 6/2008 | Irwin et al. | |
| 7,395,438 B2 | 7/2008 | Parks et al. | |
| 7,426,637 B2 | 9/2008 | Risan et al. | |
| 7,426,751 B2 | 9/2008 | Sako et al. | |
| 7,567,671 B2 | 7/2009 | Gupte | |
| 7,567,674 B2 | 7/2009 | Nishimoto et al. | |
| 7,570,761 B2 | 8/2009 | Risan et al. | |
| 7,570,762 B2 | 8/2009 | Kurihara et al. | |
| 7,584,511 B2 | 9/2009 | Fujinami et al. | |
| 7,664,956 B2 | 2/2010 | Goodman | |
| 7,757,077 B2 | 7/2010 | Peinado et al. | |
| 7,778,417 B2 | 8/2010 | Rutkowski et al. | |
| RE41,657 E | 9/2010 | Saito | |
| 7,802,095 B2 | 9/2010 | Risan et al. | |
| 7,814,022 B2 | 10/2010 | Gupte | |
| 7,848,521 B2 | 12/2010 | Leporini et al. | |
| 7,860,802 B2 | 12/2010 | Pandya et al. | |
| 7,870,385 B2 | 1/2011 | Risan et al. | |
| 7,881,656 B2 * | 2/2011 | Khedouri | G06F 17/30094 |
| | | | 455/3.01 |
| 7,940,935 B2 | 5/2011 | Nakahara et al. | |
| 8,005,757 B2 | 8/2011 | Peinado et al. | |
| 8,041,034 B2 | 10/2011 | Kim et al. | |
| 8,099,369 B2 | 1/2012 | Fahrny et al. | |
| 8,112,361 B2 | 2/2012 | Golan et al. | |
| 8,175,976 B2 | 5/2012 | Fukushima et al. | |
| 8,180,708 B2 | 5/2012 | Hurtado et al. | |
| 8,224,751 B2 | 7/2012 | Farrugia et al. | |
| 8,306,918 B2 | 11/2012 | Farrugia et al. | |
| 8,347,098 B2 | 1/2013 | Farrugia et al. | |
| 2001/0042043 A1 | 11/2001 | Shear et al. | |
| 2001/0053979 A1 | 12/2001 | Kori | |
| 2001/0054027 A1 | 12/2001 | Hasegawa | |
| 2001/0056539 A1 * | 12/2001 | Pavlin | G06F 21/123 |
| | | | 713/193 |
| 2002/0002674 A1 | 1/2002 | Grimes et al. | |
| 2002/0006204 A1 | 1/2002 | England et al. | |
| 2002/0007454 A1 | 1/2002 | Tarpenning et al. | |
| 2002/0019814 A1 | 2/2002 | Ganesan | |
| 2002/0064280 A1 | 5/2002 | Gassho | |
| 2002/0085713 A1 | 7/2002 | Feig et al. | |
| 2002/0138593 A1 | 9/2002 | Novak et al. | |
| 2002/0178360 A1 | 11/2002 | Wenocur et al. | |
| 2003/0002668 A1 | 1/2003 | Grasunke | |
| 2003/0018582 A1 | 1/2003 | Yaacovi | |
| 2003/0023564 A1 | 1/2003 | Padhye et al. | |
| 2003/0028539 A1 | 2/2003 | Nunome et al. | |
| 2003/0056212 A1 | 3/2003 | Siegel et al. | |
| 2003/0070092 A1 | 4/2003 | Hawkes | |
| 2003/0078853 A1 | 4/2003 | Peinado et al. | |
| 2003/0079038 A1 | 4/2003 | Robbin et al. | |
| 2003/0084306 A1 | 5/2003 | Abburi et al. | |
| 2003/0115069 A1 | 6/2003 | Pence et al. | |
| 2003/0131353 A1 | 7/2003 | Blom et al. | |
| 2003/0161473 A1 | 8/2003 | Fransdonk | |
| 2003/0187883 A1 | 10/2003 | Zelenka et al. | |
| 2003/0194092 A1 | 10/2003 | Parks et al. | |
| 2003/0198349 A1 | 10/2003 | Aizu et al. | |
| 2003/0217011 A1 | 11/2003 | Peinado et al. | |
| 2003/0229789 A1 | 12/2003 | Morais | |
| 2004/0003267 A1 | 1/2004 | Strom et al. | |
| 2004/0024688 A1 | 2/2004 | Bi et al. | |
| 2004/0032950 A1 | 2/2004 | Graunke | |
| 2004/0039932 A1 | 2/2004 | Elazar et al. | |
| 2004/0044779 A1 | 3/2004 | Lambert | |
| 2004/0049694 A1 | 3/2004 | Candelore | |
| 2004/0064416 A1 | 4/2004 | Peled et al. | |
| 2004/0103300 A1 | 5/2004 | Risan et al. | |
| 2004/0107356 A1 | 6/2004 | Shamoon et al. | |
| 2004/0111613 A1 | 6/2004 | Shen-Orr et al. | |
| 2004/0111631 A1 | 6/2004 | Kocher et al. | |
| 2004/0143760 A1 | 7/2004 | Alkove et al. | |
| 2004/0148523 A1 | 7/2004 | Lambert | |
| 2004/0158712 A1 | 8/2004 | Lee et al. | |
| 2004/0177257 A1 | 9/2004 | Fujinawa | |
| 2004/0181490 A1 | 9/2004 | Gordon et al. | |
| 2004/0181667 A1 | 9/2004 | Venters, III et al. | |
| 2004/0187014 A1 | 9/2004 | Molaro | |
| 2004/0190723 A1 | 9/2004 | Fukuda | |
| 2004/0242224 A1 | 12/2004 | Janik et al. | |
| 2004/0242269 A1 | 12/2004 | Fadell | |
| 2004/0249768 A1 | 12/2004 | Kontio et al. | |
| 2004/0255123 A1 | 12/2004 | Noyama et al. | |
| 2004/0260716 A1 * | 12/2004 | Sugiura | G06Q 10/00 |
| 2005/0004875 A1 | 1/2005 | Kontio et al. | |
| 2005/0027991 A1 | 2/2005 | DiFonzo | |
| 2005/0028192 A1 | 2/2005 | Hooper et al. | |
| 2005/0050345 A1 | 3/2005 | Dowdy et al. | |
| 2005/0071278 A1 | 3/2005 | Simelius | |
| 2005/0071280 A1 | 3/2005 | Irwin et al. | |
| 2005/0071744 A1 | 3/2005 | Dunbar et al. | |
| 2005/0074125 A1 | 4/2005 | Chavanne et al. | |
| 2005/0086326 A1 | 4/2005 | Manning et al. | |
| 2005/0091173 A1 | 4/2005 | Alve | |
| 2005/0096326 A1 | 5/2005 | Berg et al. | |

(56) References Cited

U.S. PATENT DOCUMENTS

| | | |
|---|---|---|
| 2005/0097063 A1 | 5/2005 | Benaloh |
| 2005/0102513 A1 | 5/2005 | Alve |
| 2005/0144134 A1 | 6/2005 | Hirano et al. |
| 2005/0169467 A1 | 8/2005 | Risan et al. |
| 2005/0182931 A1 | 8/2005 | Robert et al. |
| 2005/0193205 A1 | 9/2005 | Jacobs et al. |
| 2005/0203959 A1 | 9/2005 | Muller et al. |
| 2005/0210249 A1 | 9/2005 | Lee et al. |
| 2005/0216763 A1 | 9/2005 | Lee et al. |
| 2005/0228988 A1 | 10/2005 | Traw et al. |
| 2005/0232593 A1 | 10/2005 | Kanai |
| 2005/0268098 A1 | 12/2005 | Oh et al. |
| 2005/0273629 A1 | 12/2005 | Abrams et al. |
| 2005/0278259 A1 | 12/2005 | Gunaseelan et al. |
| 2005/0283791 A1 | 12/2005 | McCarthy et al. |
| 2005/0289076 A1 | 12/2005 | Lambert |
| 2006/0005257 A1 | 1/2006 | Tohru et al. |
| 2006/0008256 A1* | 1/2006 | Khedouri .......... G06F 17/30038 386/234 |
| 2006/0010500 A1 | 1/2006 | Elazar et al. |
| 2006/0015944 A1 | 1/2006 | Fields |
| 2006/0015945 A1 | 1/2006 | Fields |
| 2006/0020784 A1 | 1/2006 | Jonker et al. |
| 2006/0021068 A1 | 1/2006 | Xu et al. |
| 2006/0026691 A1 | 2/2006 | Kim et al. |
| 2006/0053079 A1 | 3/2006 | Edmonson et al. |
| 2006/0107285 A1 | 5/2006 | Medvinsky |
| 2006/0159303 A1 | 7/2006 | Davis et al. |
| 2006/0173783 A1* | 8/2006 | Marples ................ G06F 21/10 705/51 |
| 2006/0262927 A1 | 11/2006 | Rutkowski et al. |
| 2006/0282864 A1 | 12/2006 | Gupte |
| 2007/0083473 A1 | 4/2007 | Farrugia et al. |
| 2007/0107063 A1 | 5/2007 | Eckleder |
| 2007/0150917 A1* | 6/2007 | Fernandez ........ G06F 17/30017 725/10 |
| 2007/0198419 A1 | 8/2007 | Park et al. |
| 2007/0208668 A1 | 9/2007 | Candelore |
| 2007/0219911 A1* | 9/2007 | Abe ........................ G06F 21/10 705/51 |
| 2007/0219917 A1 | 9/2007 | Liu et al. |
| 2007/0260548 A1 | 11/2007 | Farrugia et al. |
| 2007/0276760 A1 | 11/2007 | Kanehara et al. |
| 2008/0256368 A1 | 10/2008 | Ross et al. |
| 2008/0294901 A1 | 11/2008 | Farrugia et al. |
| 2009/0063871 A1 | 3/2009 | Frijters et al. |
| 2009/0177881 A1 | 7/2009 | Traw et al. |
| 2010/0287620 A1 | 11/2010 | Fanton et al. |
| 2013/0003977 A1 | 1/2013 | Farrugia et al. |
| 2013/0067244 A1 | 3/2013 | Farrugia et al. |
| 2013/0073466 A1 | 3/2013 | Farrugia et al. |
| 2013/0247228 A1 | 9/2013 | Wang et al. |
| 2014/0075180 A1 | 3/2014 | Farrugia et al. |

FOREIGN PATENT DOCUMENTS

| | | |
|---|---|---|
| AU | 2012227266 | 10/2012 |
| CA | 2476919 | 2/2006 |
| CA | 2625360 | 4/2007 |
| CA | 2715439 | 4/2007 |
| CN | 1604080 | 4/2005 |
| EP | 0614308 | 9/1994 |
| EP | 0715246 | 6/1996 |
| EP | 1085443 | 3/2001 |
| EP | 1189432 | 3/2002 |
| EP | 1465426 | 10/2004 |
| EP | 1521260 | 4/2005 |
| EP | 1777639 | 4/2007 |
| EP | 1777706 | 4/2007 |
| EP | 1852799 | 11/2007 |
| EP | 2065828 | 6/2009 |
| EP | 2315151 | 4/2011 |
| EP | 2466511 | 6/2012 |
| EP | 2485174 | 8/2012 |
| EP | 2528007 | 11/2012 |
| EP | 2528008 | 11/2012 |
| JP | 2001-160003 | 6/2001 |
| JP | 2001-256196 | 9/2001 |
| JP | 2002-007733 | 1/2002 |
| JP | 2003-058660 | 2/2003 |
| JP | 2005-110215 | 4/2005 |
| JP | 2005-228347 | 8/2005 |
| WO | 1996/024209 | 8/1996 |
| WO | WO 2000/031964 | 6/2000 |
| WO | WO 2002/003176 | 1/2002 |
| WO | WO 03/036541 | 5/2003 |
| WO | WO 2003/088065 | 10/2003 |
| WO | WO 2004/008460 | 1/2004 |
| WO | WO 2004/070588 | 8/2004 |
| WO | WO 2004/097609 | 11/2004 |
| WO | 2005043802 A1 | 5/2005 |
| WO | 2005/093745 | 10/2005 |
| WO | WO 2005/106681 | 11/2005 |
| WO | WO 2005/116859 | 12/2005 |
| WO | WO 2006/101549 | 9/2006 |
| WO | WO 2007/044825 | 4/2007 |
| WO | WO 2008/048712 | 4/2008 |
| WO | WO 2008/147617 | 12/2008 |

OTHER PUBLICATIONS

U.S. Appl. No. 13/615,492, filed Sep. 13, 2012, Farrugia, Augustin J., et al.
Portions of prosecution history of EP07107470, dated Nov. 14, 2011, Apple Inc.
International Search Report and Written Opinion for PCT/US2007/068081, dated May 7, 2008, Apple Inc.
International Preliminary Report on Patentability and Written Opinion for PCT/US2007/068081, dated Nov. 4, 2008, Apple Inc.
Portions of prosecution history of AU2006302090, dated Jul. 16, 2012, Apple Inc.
Portions of prosecution history of AU2010201178, dated Jul. 16, 2012, Apple Inc.
Portions of prosecution history of CA20062625360, dated Sep. 10, 2010, Apple Inc.
Portions of prosecution history of CA20062715439, dated Dec. 28, 2012, Apple Inc.
Portions of prosecution history of EP06291581, dated Jul. 23, 2012, Apple Inc.
Portions of prosecution history of EP10196353, dated Jun. 27, 2012, Apple Inc.
International Search Report and Written Opinion for PCT/US2006/039778, dated Jan. 22, 2008, Apple Inc.
International Preliminary Report on Patentability for PCT/US2006/039778, dated Mar. 17, 2009, Apple Inc.
Portions of prosecution history of EP08251614, dated Feb. 9, 2012, Apple Inc.
Portions of prosecution history of EP12157933, dated Jan. 31, 2013, Apple Inc.
Portions of prosecution history of EP12157936, dated Dec. 5, 2012, Apple Inc.
International Search Report and Written Opinion for PCT/US2008/061817, dated Sep. 1, 2008, Apple Inc.
International Preliminary Report on Patentability for PCT/US2008/061817, dated Nov. 24, 2009, Apple Inc.
Gong, Li, et al., "Going Beyond the Sandbox: An Overview of the New Security Architecture in the Java <TM> Development Kit 1.2," Proceedings of the Usenix Symposium on Internet Technologies and Systems, Dec. 8-11, 1997, pp. 103-112.
Mori, Ryoichi, et al., "Superdistribution: The Concept and the Architecture," Transactions of the Institute of Electronics, Information and Communication Engineers, Jul. 1990, pp. 1133-1146., vol. E73, No. 7, Tokyo, JP.
Portions of prosecution history of AU2012227266, dated Mar. 23, 2013, Apple Inc.
Updated portions of prosecution history of CA20062625360, dated Mar. 27, 2013, Apple Inc.

(56) References Cited

OTHER PUBLICATIONS

Portions of prosecution history of EP12175992, dated Jun. 12, 2013, Apple Inc.
Updated portions of prosecution history of AU2012227266, dated Sep. 13, 2013, Apple Inc.
Updated portions of prosecution history of CA2625360, dated Sep. 24, 2013, Apple Inc.
Updated Portions of prosecution history of CA2715439, dated Aug. 15, 2013, Apple Inc.
Updated portions of prosecution history of EP12175992, dated Jul. 15, 2013, Apple Inc.
Portions of prosecution history of EP12175994, dated Jul. 29, 2013, Apple Inc.
Updated portions of prosecution history of CA2625360, dated Oct. 28, 2013, Apple Inc.
Updated portions of prosecution history of EP12157933.8, dated Dec. 8, 2013, Apple Inc.
Updated portions of prosecution history of EP12157936.1, dated Dec. 3, 2013, Apple Inc.
Updated portions of prosecution history of EP10196353, dated Oct. 3, 2013, Apple Inc.
Updated portions of prosecution history of AU2012227266, dated Oct. 15, 2013, Apple Inc.
Updated portions of prosecution history of EP07107470, dated Jul. 15, 2014, Apple Inc.
European Office Action dated Mar. 21, 2019, from European Patent Application No. 16181889.3, 5 pages.

\* cited by examiner

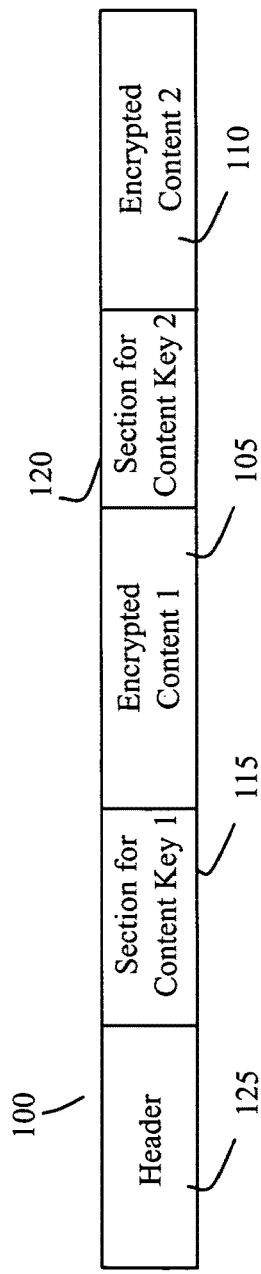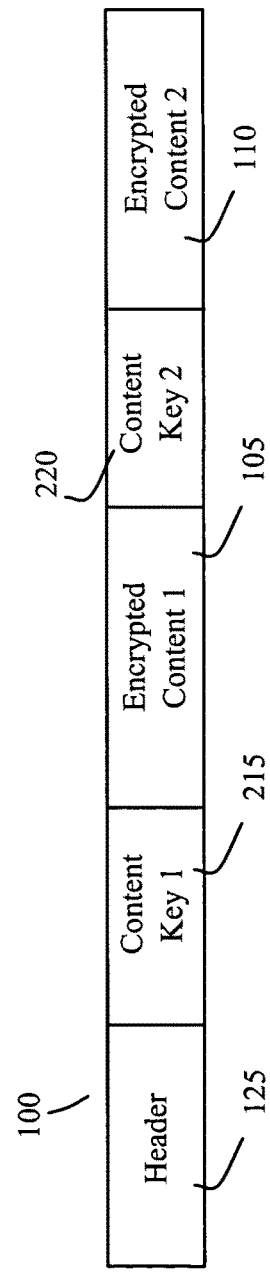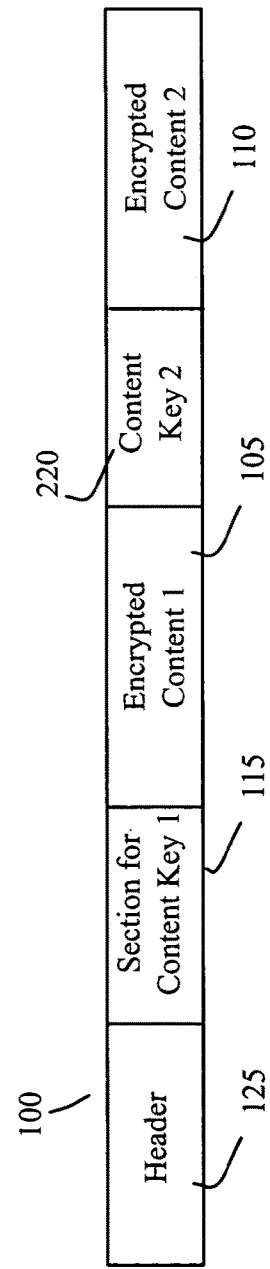

Figure 4

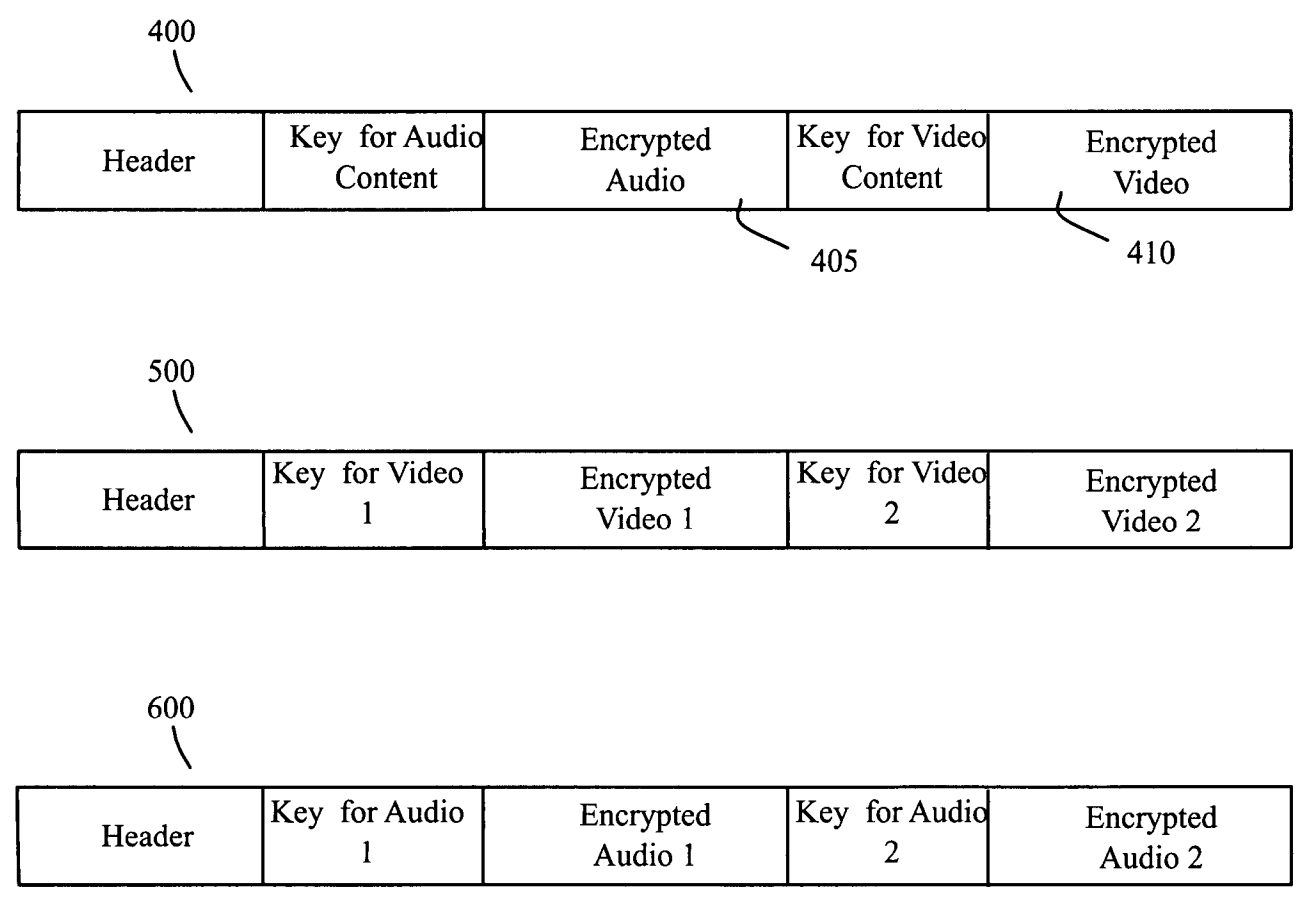

| Header | Key for Audio Content | Encrypted Audio | Key for Video Content | Encrypted Video |
|---|---|---|---|---|

| Header | Key for Video 1 | Encrypted Video 1 | Key for Video 2 | Encrypted Video 2 |
|---|---|---|---|---|

| Header | Key for Audio 1 | Encrypted Audio 1 | Key for Audio 2 | Encrypted Audio 2 |
|---|---|---|---|---|

600

| Header | Key for Audio Content | Encrypted Audio | Key for Text Content | Encrypted Text |
|---|---|---|---|---|

| Header | Key for Video Content | Encrypted Video | Key for Text Content | Encrypted Text |
|---|---|---|---|---|

| Header | Key for Audio 1 | Encrypted Audio 1 | Key for Video 1 | Encrypted Video 1 | Key for Video 2 | Encrypted Video 2 |
|---|---|---|---|---|---|---|

| Header | Key for Video 1 | Encrypted Video 1 | Key for Audio 1 | Encrypted Audio 1 | Key for Audio 2 | Encrypted Audio 2 |
|---|---|---|---|---|---|---|

USE OF MEDIA STORAGE STRUCTURE WITH MULTIPLE PIECES OF CONTENT IN A CONTENT-DISTRIBUTION SYSTEM

CLAIM OF BENEFIT TO PRIOR APPLICATIONS

This Application is a continuation application of U.S. patent application Ser. No. 11/249,123, filed Oct. 11, 2005, now U.S. Pat. No. 8,306,918 now published as U.S. Publication 2007/0083473. U.S. Publication 2007/0083473 is incorporated herein by reference.

FIELD OF THE INVENTION

The present invention relates to the use of a single media storage structure with multiple pieces of content in a digital rights management system.

BACKGROUND OF THE INVENTION

The protection of digital content transferred between computers over a network is fundamentally important for many enterprises today. Enterprises attempt to secure this protection by implementing some form of Digital Rights Management (DRM) process. The DRM process often involves encrypting the piece of content (e.g., encrypting the binary form of the content) to restrict usage to those who have been granted a right to the content.

Cryptography is the traditional method of protecting data in transit across a network. In its typical application, cryptography protects communications between two mutually trusting parties from an attack on the data in transit. However, for many digital file transfer applications today (e.g., for the transfer of audio or video content), the paradigm has shifted, as a party that receives the content (i.e., the "receiving party") might try to break the DRM encryption that the party that supplied the content (i.e., the "distributing party") applied to the content. In addition, with the proliferation of network penetration attacks, a third party may obtain access to the receiving party's computer and thus to the protected content.

Some pieces of content that are distributed in existing DRM systems are related to one another. However, existing DRM system often do not allow content recipients to flexibly purchase or license a subset of the contents from a related set of DRM contents. For instance, one existing DRM system distributes certain songs along with their associated music videos. In distributing a song along with its associated music video, this DRM system rigidly requires a recipient either (1) to purchase both the song and its associated music video, or (2) to forego access to both the song and its associated music video. Therefore, there is a need in the art for a DRM system that flexibly allows content recipients to purchase or license a subset of the content from a related set of DRM contents.

SUMMARY OF THE INVENTION

Some embodiments of the invention provide a method for distributing content over a network. The method distributes a single media storage structure to a device (e.g., a computer, portable player, etc.) that connects to the network. The media storage structure includes first and second pieces of encrypted content. Based on whether the device is allowed to access the first piece of content, the second piece of content, or both, the method provides the device with a set of keys for decrypting the pieces of the content that the device is able to access.

The provided set of keys might include one or more keys for decrypting only one of the two encrypted pieces of content. Alternatively, it might include one or more keys for decrypting both encrypted pieces of content. For instance, the selected set of keys might include a first key for decrypting the first encrypted piece and a second key for decrypting the second encrypted piece. Based on the provided set of keys, the device can then decrypt and access either one of the two pieces of content in the media storage structure or both pieces of encrypted content in the media storage structure.

The media storage structure includes a first content section that stores the first piece of encrypted content, and a second content section that stores the second piece of encrypted content. In some embodiments, the media storage structure also includes first and second key sections respectively for storing first and second keys for decrypting the first and second pieces of encrypted content. The method of some embodiments distributes the media storage structure with the encrypted first and second content pieces from a computer that is separate from the computer or computers that distribute the first and second keys. In some embodiments, the device that receives the media storage structure inserts the first and second keys in the first and second key sections of the media storage structure.

One piece of encrypted content might be audio content (e.g., an audio track, a song, a sound track, etc.) related to a particular presentation (e.g., a music video, a film, etc.), while the other piece of encrypted content might be video content (e.g., a video track, a video clip, etc.) related to the particular presentation. Alternatively, both pieces of content can be video content (e.g., video clips from different angles of one or more scenes) or audio content (e.g., different versions or mixes of a song or different languages for the dialogue in a movie). In addition, content other than audio or video might be stored in the media storage structure. For instance, one piece of content might be audio or video content, while the other piece of content might be lyrics or dialogue associate with the audio or video content piece.

The method in some embodiments distributes a media storage structure that contains more than two pieces of content. For instance, in some cases, the media storage structure includes one piece of audio content and two pieces of video content, which can be two different video clips associated with the audio content (e.g., can be two different music videos that are associated with a song).

In some embodiments, the device (e.g., the computer) that receives the media storage structure transfers the media storage structure to another device (e.g., to a portable player). In this transfer, one of the pieces of content from the media storage structure might be removed in the transfer of the media storage structure to the other device (e.g., in the portable player). In some cases, content is removed from the media storage structure in order to reduce the consumption of resources on the other device. In other cases, content is removed from the media storage structure because the other device does not have rights to access this other content.

BRIEF DESCRIPTION OF THE DRAWINGS

The novel features of the invention are set forth in the appended claims. However, for purpose of explanation, several embodiments are set forth in the following figures.

FIG. 1 illustrates an example of such a media storage structure.

FIG. 2 illustrates an example where the selected set of keys includes a first key for decrypting the first encrypted piece of content and a second key for decrypting the second encrypted piece of content.

FIG. 3 illustrates another example of the media storage structure.

FIGS. 4-10 illustrate various examples of related pieces of content in a media storage structure of some embodiments.

DETAILED DESCRIPTION OF THE INVENTION

Figure 11:
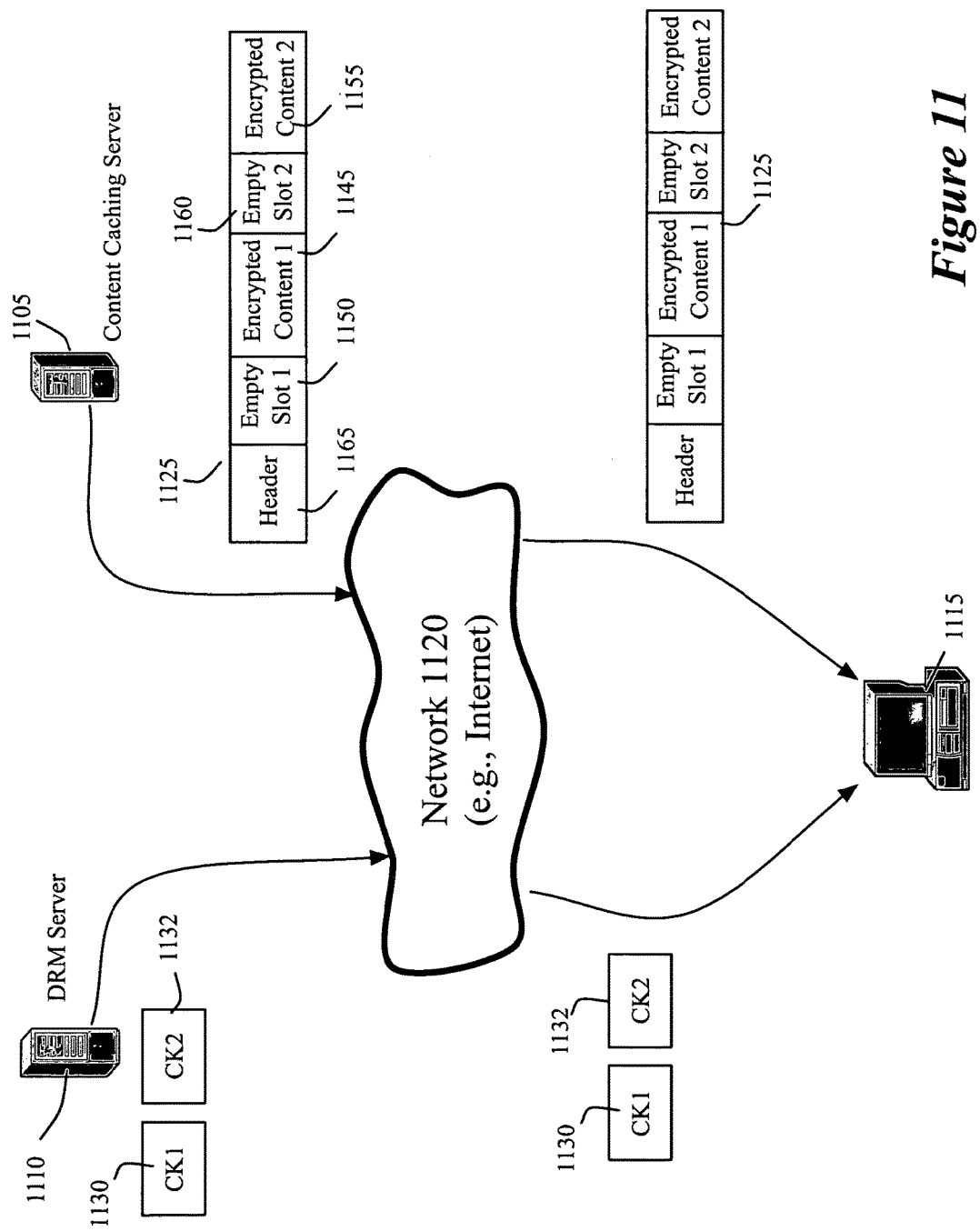
FIG. 11 illustrates a content-distribution system of some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Media Storage Structure

Some embodiments of the invention provide a content-distribution system for distributing unitary media storage structures to devices (e.g., computers, portable players, etc.) that connect to a network. Each unitary media storage structure includes a set of related pieces of content. In at least some unitary media storage structures of some embodiments, each piece of content is separately encrypted to protect it from unauthorized use. Examples of pieces of content include video, audio, text, sound, etc.

FIG. 1 conceptually illustrates an example of a unitary media storage structure 100 of some embodiments. As shown in this figure, the media storage structure includes first and second pieces 105 and 110 of encrypted content. It also includes first and second sections 115 and 120 for containing first and second cryptographic keys for decrypting the first and second pieces 105 and 110 of content. The media storage structure also includes a header 125 that includes metadata regarding the content in the media storage structure.

Based on whether the device is allowed to access the first piece of content 105, the second piece of content 110, or both, the system provides the device with a set of keys for decrypting the pieces of the content that the device is able to access. The provided set of keys might include only one key for decrypting only one of the two encrypted pieces of content. Alternatively, it might include two keys for decrypting both encrypted pieces of content.

For instance, FIG. 2 illustrates an example where the selected set of keys includes a first key 215 for decrypting the first encrypted piece of content 105 and a second key 220 for decrypting the second encrypted piece of content 110. FIG. 3 illustrates another example of the media storage structure 100. In this example, the media storage structure 100 includes only the second key 220 for decrypting the second piece of encrypted content 110.

Based on the set of keys that the system provides to the device, the device can decrypt and access either one of the two pieces of content 105 and 110 or both pieces of encrypted content. The system of some embodiments distributes the media storage structure with the encrypted first and second content pieces 105 and 110 from a computer that is separate from the computer or computers that distribute the first and second keys 215 and 220 for decrypting the first and second pieces of encrypted content.

While this application describes receiving, storing, manipulating and using a "key," it will be understood that a host of know techniques can be used to disguise the key. For example, key hiding, key encryption, splitting the key into more than one piece to be stored separately, and obfuscation of read/write operations, can all be used and are considered within the general concept of receiving, storing, and using a "key."

As mentioned above, the single media storage structure that is distributed by some embodiments includes a set of related pieces of content. In some embodiments, two pieces of content are related when they relate to the same audio and/or video presentation (e.g., song, movie, music video, etc.). In some cases, two pieces of related content can be viewed or played simultaneously. In other cases, two pieces of related content can be viewed or player independently.

FIGS. 4-10 illustrate various examples of related pieces of content in a media storage structure of some embodiments. FIG. 4 illustrates an example of a storage structure 400 where one piece of encrypted content is audio content 405 (e.g., an audio track, a song, a sound track) related to a particular presentation (e.g., a music video, a film, etc.), while the other piece of encrypted content is video content 410 (e.g., a video track, a video clip, etc.) related to the particular presentation.

FIG. 5 illustrates a storage structure 500 that includes two pieces of video content. One example of two such pieces of video content would be two video clips that are shot from different angles to cover one or more scenes in a movie. A piece of video content might also include audio content associated with its video content or might only include video data. FIG. 6 illustrates a storage structure 600 that includes two pieces of audio content. One example of two such pieces of audio content would be two different versions or mixes of a song.

Content other than audio or video might be stored in the media storage structure of the some embodiments of the invention. For instance, FIG. 7 illustrates a media storage structure 700 that stores one piece of audio content 705 and another piece of textual content 710, which might be lyrics, dialogue, or other data associated with the audio content 705. Similarly, FIG. 8 illustrates a media storage structure 800 that stores one piece of video content 805 and another piece of textual content 810, which might be dialogue associate with the video content 805.

In some cases, the system distributes a media storage structure that contains more than two pieces of content. For instance, FIG. 9 illustrates a media storage structure 900 that includes one piece of audio content (e.g., a song) along with two pieces of video content, which can be two different video clips associated with the audio content (e.g., can be two different music videos that are associated with the song).

Similarly, FIG. 10 illustrates a media storage structure 1000 that includes one piece of video content (e.g., a movie) along with two pieces of audio content, which can be the video's audio component in two different languages.

In the various examples illustrated in FIGS. 4-10, the media storage structure includes a key for decrypting each piece of content stored in the media storage structure. As mentioned above, the content-distribution system of some embodiments allows different set of keys to be acquired (e.g., purchased or licensed) for accessing a media storage structure on a particular device. In some embodiments, the device stores the acquired set of keys in the media storage structure, and uses the acquired set of keys to decrypt and access the media storage structure's content that has been purchased or licensed for access on the device. Once decrypted, the device can individually or simultaneously view or play the decrypted pieces of content.

In some embodiments, the device (e.g., the computer) that receives the media storage structure transfers the media storage structure to another device (e.g., to a portable player). In this transfer, one of the pieces of content from the media storage structure might be removed in the transfer of the media storage structure to the other device (e.g., in the portable player). In some cases, one of the pieces of content is removed in order to reduce the consumption of resources on the other device.

Some embodiments above were illustrated by reference to a media storage structure that itself includes a plurality of sections available for storage of keys. Such storage sections can be incorporated into many media file formats, including the Quicktime file format, Windows Media file format, Real media format, ISO/IEC 14496-12, Motion JPEG, etc. One of ordinary skill will realize that in some embodiments the keys are alternatively stored and transferred separately from the unitary media files to which they pertain.

II. Content-Distribution System

FIG. 11 illustrates a content-distribution system 1100 of some embodiments. This content-distribution system distributes content in a manner that protects the digital rights (i.e., ensures the legal use) of the content. To distribute content that is related, the system distributes single media storage structures with multiple related pieces of content. In this example, the media storage structures are media files. One of ordinary skill will realize that other embodiments might use other types of storage structures.

As shown in FIG. 11, the content-distribution system 1100 includes a content-caching server 1105, a DRM server 1110, and a content-receiving computer 1115. The computer 1115 connects to the servers 1105 and 1110 through a computer network, such as a local area network, a wide area network, a network of networks (e.g., the Internet), etc.

Through this connection, the computer 1115 communicates with the DRM server 1110 to obtain content. In some embodiments, the content-distribution system 1100 does not entail the sale or licensing of content. Accordingly, in these embodiments, the DRM server 1110 simply enforces the distribution of content to authorized computers without considering any financial objectives.

For purposes of illustration, however, several embodiments of the content-distribution system 1100 that are described below are involved in the sale or licensing of the content. Accordingly, in these embodiments, the DRM server 1110 is the server from which the user of the computer 1115 can purchase or license content. In other words, the DRM server 1110 of some embodiments is the server that handles the financial transaction for purchasing or licensing content. In some instance, certain content can be purchased or licensed free.

After the DRM server 1110 determines that the computer 1115 can obtain the content, the content-distribution system 1100 uses the content caching server 1105 to provide a media storage file that contains one or more pieces of DRM content to the computer 1115 through the network 1120. In some embodiments, the system 1100 uses multiple caching servers 1105 to cache content at various locations on the network, in order to improve the speed and efficiency of downloading content across the network. For each media storage file that the DRM server 1110 directs the caching server 1105 to provide to the computer 1115, the DRM server 1110 provides a set of keys for the computer to use to decrypt the content that is stored in the media storage file.

Figure 12:
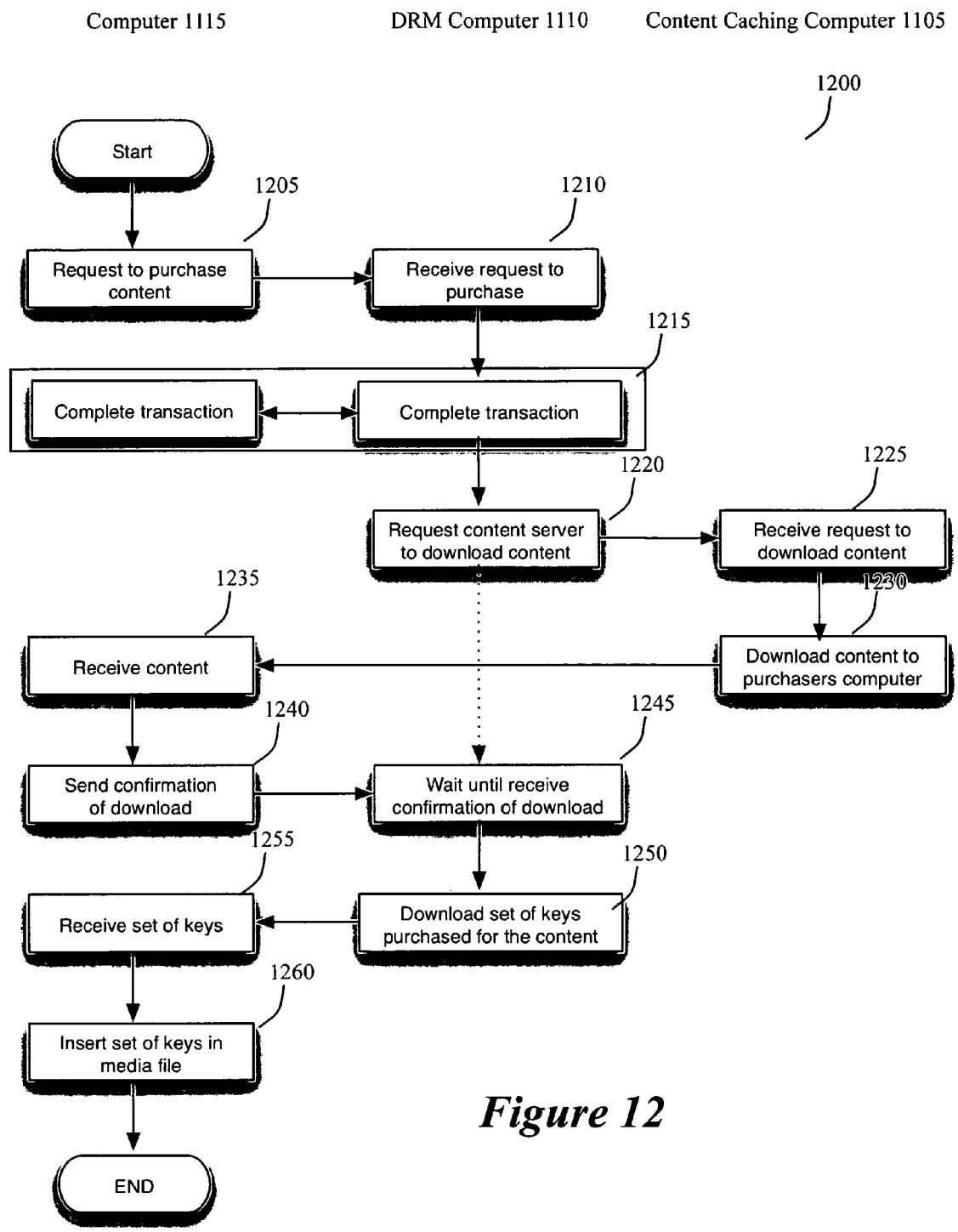
FIG. 12 conceptually illustrates an example of one possible set of interactions between the computer, the DRM server, and the content-caching server.

FIG. 12 conceptually illustrates an example of one possible set of interactions between the computer 1115, the DRM server 1110, and the content-caching server 1105. This set of interactions represents a content-acquisition process 1200 of some embodiments of the invention. As shown in this figure, the acquisition process 1200 starts when the computer 1115 sends (at 1205) a request to the DRM server 1110 to purchase or license one or more pieces of content that are stored in a particular media file. At 1210, the DRM server receives this request.

The acquisition process then has the DRM server 1110 and/or purchasing computer 1115 perform one or more operations (at 1215) to complete the purchase or license transaction. After the transaction has been completed, the DRM server 1110 sends (at 1215) a request to the content-caching server 1105 to send the media file for the purchased or licensed content to the computer 1115.

The caching server 1105 receives this request at 1225, and in response, commences (at 1230) a download of the media file to the purchasing computer 1115. FIG. 11 illustrates an example of a media file 1125 that the content caching server 1105 downloads to the computer 1115. In this example, the media file has five sections. The first and second section 1145 and 1155 contain two pieces of encrypted content. Each piece of content is encrypted using a particular content key. The third and fourth sections 1150 and 1160 are empty sections in the file for the insertion of the content keys if such content keys are purchased or licensed by the computer 1115. Lastly, the fifth section 1165 is a header field, which contains metadata regarding the content and/or content keys.

The computer 1115 receives (at 1235) the media file provided by the caching server. The computer 1115 then sends (at 1240) a confirmation of the download to the DRM server 1110. After 1220, the DRM server 1110 transitions to a wait state 1245 to wait for the confirmation to be received from the computer 1115.

Once the DRM server 1110 receives the confirmation of the download at 1245, it sends (at 1250) to the computer 1115 a set of keys based on the pieces of content that the computer 1115 purchased or licensed. In the example illustrated in FIG. 11, the computer 1115 has acquired both pieces of content that is stored in the media file. Accordingly, in this example, the DRM server 1110 sends (at 1250) a set of keys that would allow the computer 1115 to access both pieces of content in the media file 1125.

In the example illustrated in FIG. 11, this set of keys includes two content keys 1130 and 1132. In some embodiments, each piece of content (e.g., 1145 or 1155) is encrypted based on a particular content key (e.g., 1130 or 1132). Hence, the computer 1115 uses the content key 1130 to decrypt the encrypted content 1145, and uses the content key 1132 to decrypt the encrypted content 1155.

Figure 13:
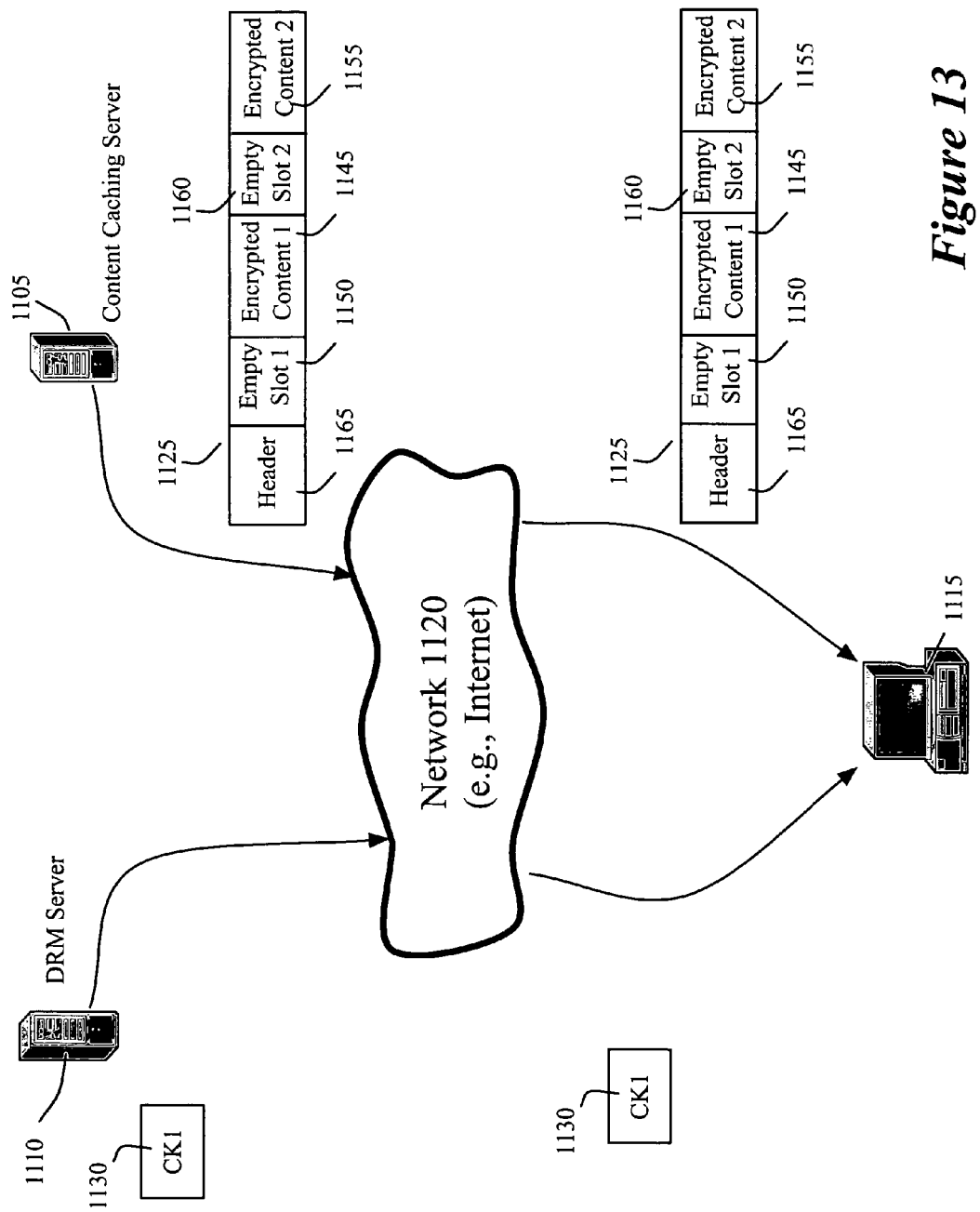
FIG. 13 illustrates another example of a computer acquiring a media file.

FIG. 13 illustrates another example of the computer 1115 acquiring the media file 1125. In this example, the computer 1115 has only acquired the first encrypted content 1145. Accordingly, even though the caching server 1105 supplies the computer 1115 with the media file that contains both pieces of content, the DRM server 1110 only supplies the content key 1130 for the encrypted content 1145.

Accordingly, in this example, the computer can access the encrypted content 1145 in the media file by using the content key 1130. However, since the computer 1115 has not received the encrypted content for the encrypted content 1155 in the media file 1125, the computer cannot decrypt the encrypted content 1155.

Figure 14:
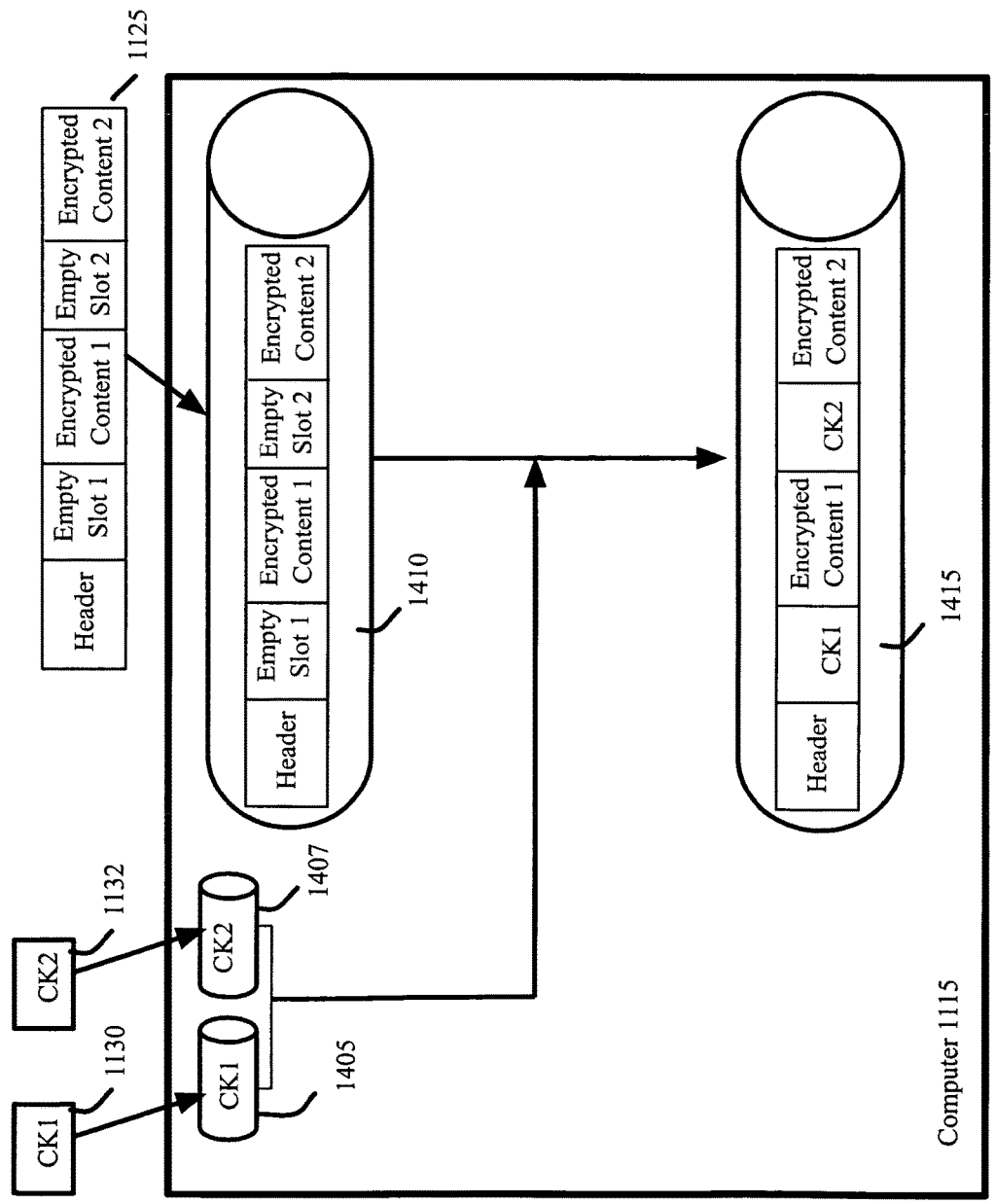
FIG. 14 illustrates a computer's storage of the two keys that it receives in the example illustrated in FIG. 11.

As shown in FIG. 12, the computer 1115 receives (at 1255) the set of keys supplied by the DRM server 1110. As shown in FIG. 12, the computer 1115 stores (at 1260) this set of keys in the media file. FIG. 14 illustrates the computer's storage of the two keys that it receives in the example illustrated in FIG. 11. As shown in this figure, the computer 1115 initially stores the content keys 1130 and 1132 in temporary storages 1405 and 1407. It then merges these content keys with the media file 1125 that it received at 1235 and that it temporarily stored in a temporary storage 1410. The computer then stores the media file that results from this merging in a content library storage 1415.

Figure 15:
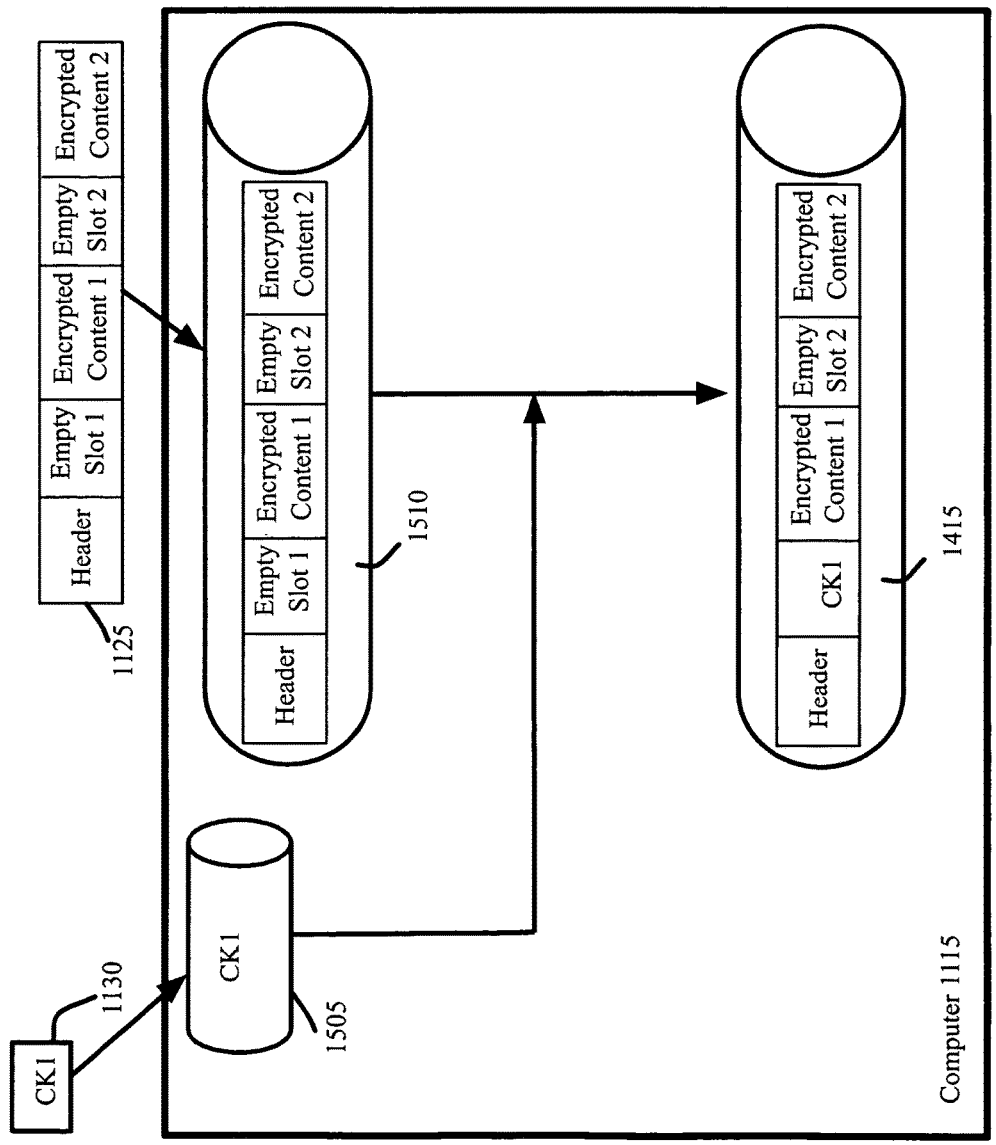
FIG. 15 illustrates a computer's storage of the key that it receives in the example illustrated in FIG. 13.

FIG. 15 illustrates the computer's storage of the key that it receives in the example illustrated in FIG. 13. The storage operation illustrated in FIG. 15 is similar to the storage operation illustrated in FIG. 14, except that the merge file (stored in the content media library 1415) does not contain the content key 1132 for the second encrypted content as the computer did not acquire and receive this content key.

In the embodiments described above, the content-distribution system 1100 utilizes one computer to provide the encrypted content while using another computer to provide the keys necessary for decrypting the encrypted content. One of ordinary skill will realize that in other embodiments the content-distribution system utilizes one computer to provide encrypted content and the keys for decrypting the encrypted content.

Alternatively, in other embodiments, the content-distribution system uses more than one computer to provide the cryptographic keys for the content. For example, keys for audio content may be available from one server and keys for related video content stored in the same media storage structure may be available from a separate server. The multiple servers may even be owned and administered by different parties, as may be the rights they administer.

Also, in the embodiments described above, the content-distribution system 1100 provides different cryptographic keys for decrypting different pieces of content. In other embodiments, the content-distribution system might utilize different encoding schemes for encrypting different pieces of content. For instance, the system might utilize a symmetric encoding scheme to encrypt audio content but utilize an asymmetric encrypting scheme to encrypt video content. Alternatively, the system might encrypt audio content in its entirety, while encrypting only parts of the video content.

Also, FIG. 12 illustrates one possible set of interactions between the computer 1115, the DRM server 1110, and the caching server 1105. One of ordinary skill will realize that these computers might interact differently in other embodiments. For instance, in some embodiments, the computer 1115 does not send a confirmation of the receipt of a media file to the DRM server. In some of these embodiments, the DRM server on its own sends the set of keys to the computer 1115.

Although some embodiments have been described with reference to a simplified network configuration, it will be understood that many variations exist within the framework described herein. For example, the DRM server is shown as a single computer, but for the purposes of this patent, such a server could include many interconnected computers and/or memory and/or interconnecting pieces of equipment. Similarly, the content caching server could be a single computer or a collection of networked computers and memory all forming a server. Additionally, while content may be supplied from a content caching server directly or indirectly to a specific client computer, other transfer methods may result in a computer requiring keys to unlock content available to it from a peer computer, portable storage device, or some other transfer mechanism.

III. Synchronization with a Player

In some embodiments, the computer 1115 can synchronizes its DRM content with a portable player that is also allowed access to the DRM content. In some cases, this synchronization removes one or more pieces of content from a media file that the computer downloads to the portable player. In some cases, the pieces of content are removed in order to reduce the consumption of resources on the other device. In other cases, content is removed from the media storage structure because the other device does not have rights to access this other content.

Figure 16:
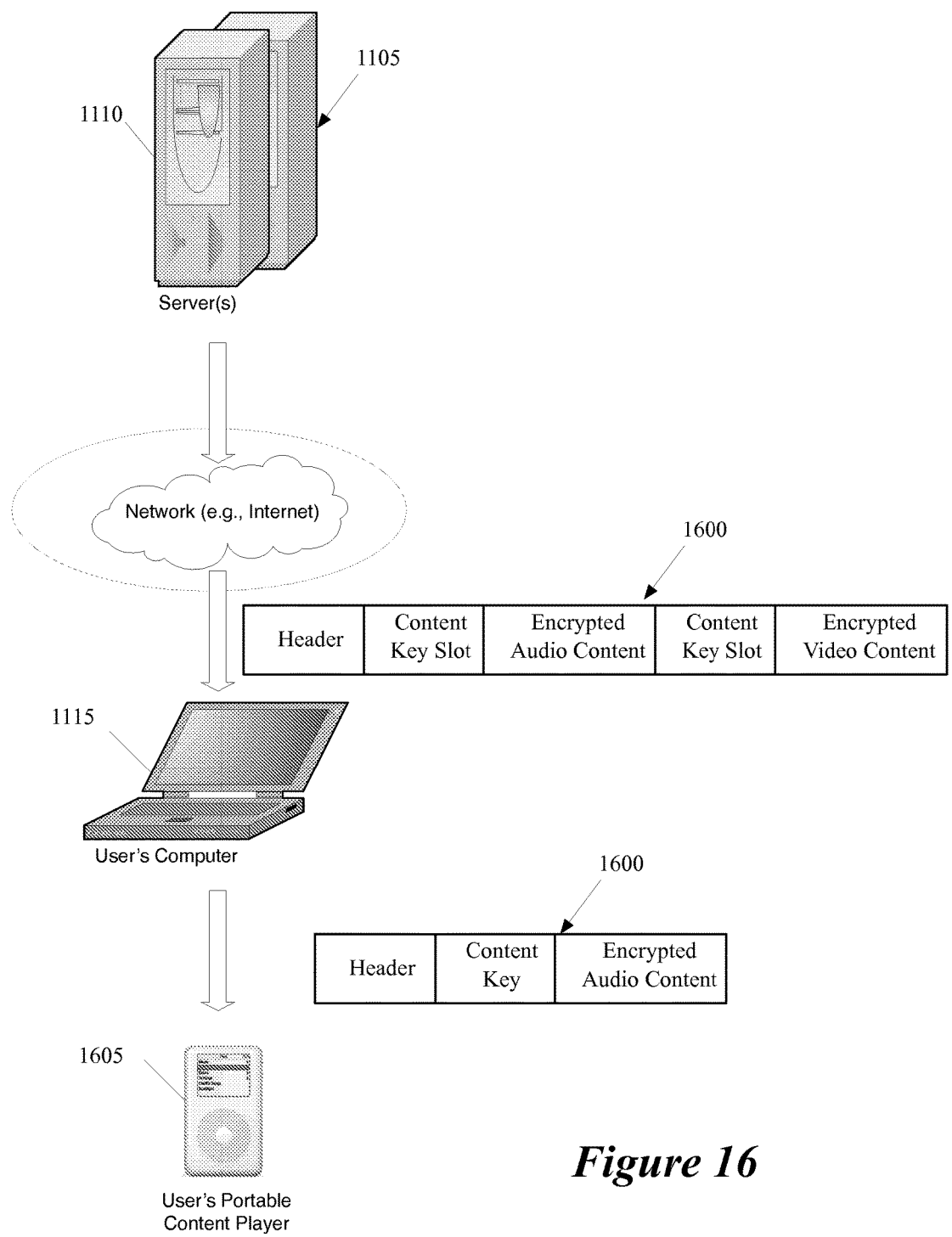
FIG. 16 illustrates an example of the computer synchronizing its DRM content with a portable player.

FIG. 16 illustrates an example of the computer 1115 synchronize its DRM content with a portable player 1605. The portable player can be a music player, audio/video player, etc. When the computer 1115 synchronizes its DRM content with the player 1605, the portable player 1605 in some embodiments receives (1) DRM content from the computer 1115, and (2) a content key for decrypting each piece of DRM content that it receives. The portable then stores the received encrypted DRM content and the associated keys.

Figure 17:
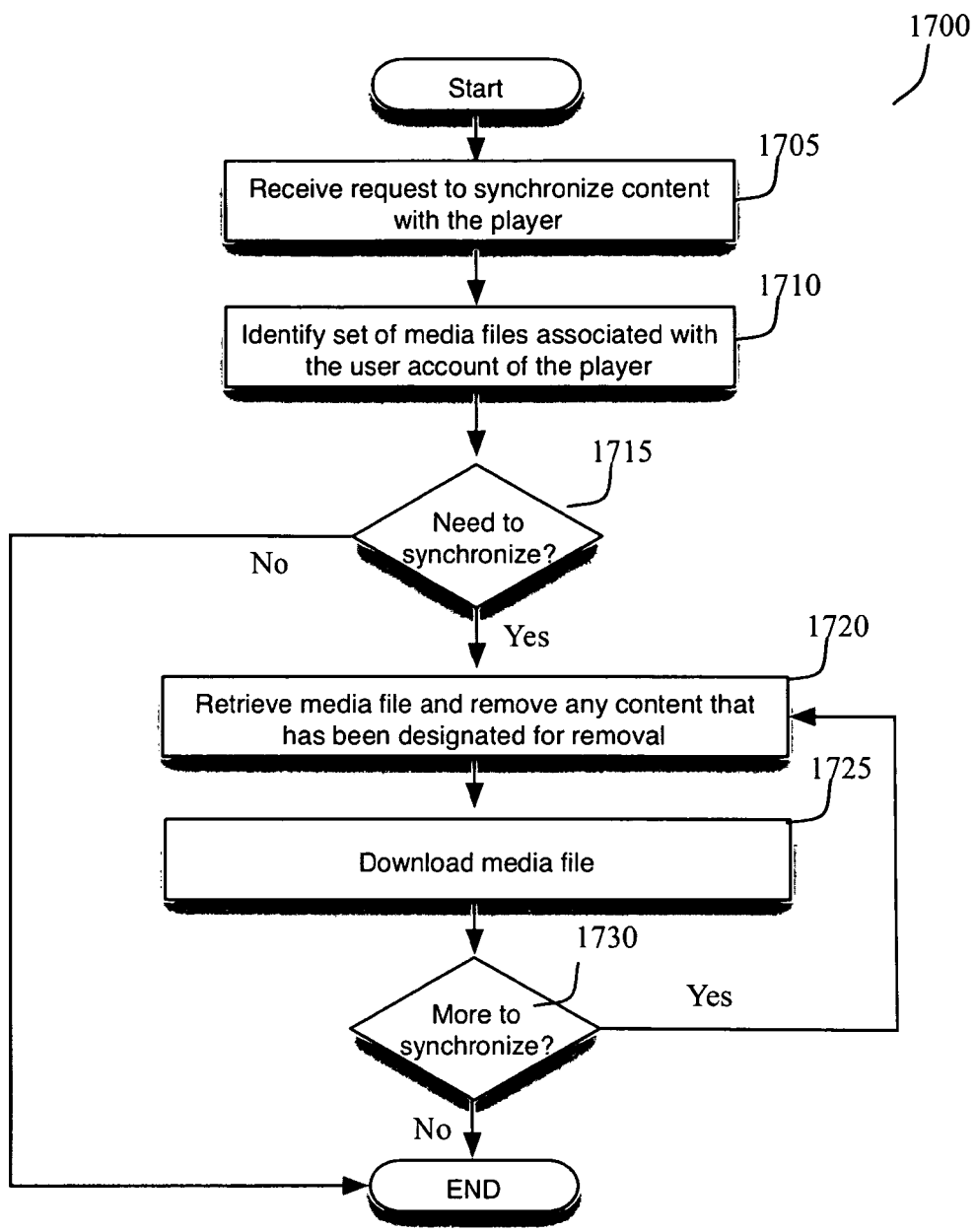
FIG. 17 conceptually illustrates a process that a computer performs in some embodiments to synchronize a set of content with a portable player.

FIG. 17 conceptually illustrates a process 1700 that a computer 1115 performs in some embodiments to synchronize a set of content with a player 1605. As shown in this figure, the process 1700 starts (at 1705) when it receives a request to synchronize a set of content with the player 1605. The process then identifies (at 1710) the set of media files that is associated with a user account ID of the player.

Next, the process determines (at 1715) whether the computer 1115 is storing any media file for the player, which it has not yet downloaded to the player (i.e., whether there is any media file that needs to be synchronized between the computer and the player). If not, the process ends.

Otherwise, the process selects (at 1720) a media file that needs to be synchronized. At 1720, the process removes from the media file any piece of content that has been designated as content that should not be downloaded to the portable player. In some embodiments, the computer uses an application that allows a user to designate the content that the user wishes to synchronize with the portable player.

If the process removes (at 1720) any content from the media file, it also removes the content's associated content key and metadata from the media file in some embodiments of the invention. FIG. 16 illustrates an example of the removal of the video content and its associated content key from a media file 1600 that is downloaded to the portable player 1605.

After 1720, the process downloads (at 1725) the media file that contains only the encrypted content that has to be synchronized with the player (i.e., downloads the media file after any content that should not be downloaded to the player has been removed). In some embodiments, the downloaded media file not only contains one or more pieces of encrypted content but also contains one or more content keys that can be used to decrypt the content. In some embodiments, the set of keys that is downloaded in the media file to the player is the same set of keys that are used to decrypt the content on the computer 1115. In other embodiments, the keys in the downloaded media file are a different set of keys.

The player then stores (at 1725) the downloaded media file on its internal storage (e.g., its internal non-volatile storage, hard drive, flash memory, etc.). After 1725, the process determines (at 1730) whether there is any additional content for the player that it has not yet downloaded to the player (i.e., whether there is any additional content that needs to be synchronized between the computer and the player). If so, the process repeats 1720 and 1725 for a piece of content that needs to be synchronized. If not, the process ends.

FIG. 17 provides an illustrative example of synchronizing media files between a computer and a player in some embodiments of the invention. One of ordinary skill will realize that other embodiments use other processes for synchronizing media files. Also, in some embodiments, the portable player directly communicates with the DRM server and/or the content caching server to obtain content.

IV. Encryption

As described above, several embodiments of the invention provide DRM processes and systems for distributing content. These processes and systems encrypt and decrypt content based on cryptographic keys. Encrypting content entails transforming the content from a decipherable form (called plaintext) into an indecipherable form (called ciphertext) based on one or more cryptographic keys. Decrypting content entails transforming encrypted content into a decipherable from by using one or more cryptographic keys.

An encryption key is a piece of information that controls the operation of a cryptography algorithm. In symmetrical encryption technology, the key that is used to encrypt content is the same key that is used to decrypt content. In asymmetric encryption technology, the same key is not used to encrypt and decrypt the content. For instance, in one scheme, an encrypting device uses a public key of a recipient to encrypt content, and the recipient uses its private key to decrypt the encrypted content.

Many of the features of the embodiments described above can be implemented according to a symmetrical or asymmetrical encryption approach. Also, in some embodiments, the encryption is applied to a binary format of the content. Although the unencrypted binary format of a piece of content may be hard for a human to decipher, it can be deciphered by an application—or an operating system. On the other hand, encrypted binary format of a piece of content ideally should not be deciphered by any application or operating system, without first being decrypted by using one or more cryptographic keys.

While the invention has been described with reference to numerous specific details, one of ordinary skill in the art will recognize that the invention can be embodied in other specific forms without departing from the spirit of the invention. For instance, even though one set of keys are described above for the media storage files of some embodiments, other embodiments provide different sets of keys for defining different levels of access on different devices to the content of a media storage file. Thus, one of ordinary skill in the art would understand that the invention is not to be limited by the foregoing illustrative details, but rather is to be defined by the appended claims.

What is claimed is:

1. A method for synchronizing encrypted content stored on a first device with a second device, the method comprising:

identifying a media storage structure that includes (i) a set of encrypted content pieces that includes at least one content piece to be transferred to the second device and (ii) a set of keys used to decrypt the encrypted content pieces, each key used by the first device to decrypt and access a different content piece based on a first set of rights that indicates which of the encrypted content pieces the first device has authorization to access;

receiving a request to synchronize the set of encrypted content pieces with the second device;

in response to the request, identifying a second set of rights that indicates which encrypted content pieces the second device has authorization to access;

updating the media storage structure by:

based on the second set of rights, removing from the media storage structure at least one encrypted content piece that the second device does not have authorization to access; and removing, from the media storage structure, the keys associated with each of the removed encrypted content pieces that the second device does not have authorization to access; and transferring the updated media storage structure to the second device, wherein the updated media storage structure includes at least (i) one particular encrypted content piece that the second device is authorized to access and (ii) the key for decrypting the particular encrypted content piece, wherein the identifying, receiving, identifying, updating, and transferring are performed by the first device.

2. The method of claim 1 further comprising:

receiving the media storage structure from a content-caching server prior to receiving the request.

3. The method of claim 2 further comprising receiving the set of keys from a DRM server prior to receiving the request and after receiving the media storage structure from the content-caching server.

4. The method of claim 3 further comprising storing the set of keys in the media storage structure before receiving the request.

5. The method of claim 4, wherein the media storage structure further comprises a set of slots for storing the keys.

6. A non-transitory machine readable medium storing a program which when executed by at least one processor of a first device causes the first device to perform operations for synchronizing encrypted content stored on the first device with a second device, the operations comprising:

identifying a media storage structure that includes (i) a set of encrypted content pieces that includes at least one content piece to be transferred to the second device and (ii) a set of keys used to decrypt the encrypted content pieces, each key used by the first device to decrypt and access a different content piece, based on a first set of rights that indicates which of the encrypted content pieces the first device has authorization to access;

receiving a request to synchronize the set of encrypted content pieces with the second device;

in response to the request, identifying a second set of rights that indicates which encrypted content pieces the second device has authorization to access;

updating the media storage structure by:

based on the second set of rights, removing from the media storage structure at least one encrypted content piece that the second device does not have authorization to access; and removing, from the media storage structure, the key associated with each of the removed encrypted content pieces that the second device does not have authorization to access; and transferring the updated media storage structure to the second device, wherein the updated media storage structure includes at least (i) one particular encrypted content piece that the second device is authorized to access and (ii) the key for decrypting the particular encrypted content piece.

7. The non-transitory machine readable medium of claim 6, wherein the program further comprises a set of instructions for enabling a user of the first device to designate which encrypted content pieces should be transferred to the second device.

8. The non-transitory machine readable medium of claim 6, wherein the second set of rights is identified based on a user account ID of the second device.

9. The non-transitory machine readable medium of claim 6, wherein the first device is a computer and the second device is a portable media player.

10. The non-transitory machine readable medium of claim 6, wherein the operations further comprise:
receiving the media storage structure from a content-caching server;
receiving the set of keys from a DRM server after receiving the media storage structure from the content-caching server; and
storing the set of keys in the media storage structure prior to receiving the request.

11. The non-transitory machine readable medium of claim 6, wherein the request to synchronize the set of encrypted content pieces is a request to synchronize a content library of the first device, wherein the operations further comprise iteratively performing said identifying, updating, and transferring until a determination is made that the content library of the first device no longer contains encrypted content pieces to be transferred to the second device.

12. The non-transitory machine readable medium of claim 6, wherein the at least one encrypted content piece is removed by the first device when the second device does not have rights to access all of the encrypted content pieces in the media storage structure.

13. The method of claim 1, wherein the at least one encrypted content piece is removed by the first device when the second device does not have rights to access all of the encrypted content pieces in the media storage structure.

14. A first device comprising:
a set of processors; and
a non-transitory machine readable medium storing a program which when executed by at least one of the processors causes the first device to perform operations for synchronizing encrypted content stored on the first device with a second device, the operations comprising:
identifying a media storage structure that includes (i) a set of encrypted content pieces that includes at least one content piece to be transferred to the second device and (ii) a set of keys used to decrypt the encrypted content pieces, each key used by the first device to decrypt and access a different content piece based on a first set of rights that indicates which of the encrypted content pieces the first device has authorization to access;
receiving a request to synchronize the set of encrypted content pieces with the second device;
in response to the request, identifying a second set of rights that indicates which encrypted content pieces the second device has authorization to access;
updating the media storage structure by:
based on the second set of rights, removing from the media storage structure at least one encrypted content piece that the second device does not have authorization to access; and
removing, from the media storage structure, the key associated with each of the removed encrypted content pieces that the second device does not have authorization to access; and
transferring the updated media storage structure to the second device, wherein the updated media storage structure includes at least (i) one particular encrypted content piece that the second device is authorized to access and (ii) the key for decrypting the particular encrypted content piece.

15. The first device of claim 14, wherein the operations further comprise enabling a user of the first device to designate which encrypted content pieces should be transferred to the second device.

16. The first device of claim 14, wherein the second set of rights is identified based on a user account ID of the second device.

17. The first device of claim 14, wherein the first device is a computer and the second device is a portable media player.

18. The first device of claim 14, wherein the operations further comprise:
receiving the media storage structure from a content-caching server;
receiving the set of keys from a DRM server after receiving the media storage structure from the content-caching server; and
storing the set of keys in the media storage structure prior to receiving the request.

19. The first device of claim 14, wherein the request to synchronize the set of encrypted content pieces is a request to synchronize a content library of the first device, wherein the operations further comprise iteratively performing said identifying, updating, and transferring until a determination is made that the content library of the first device no longer contains encrypted content pieces to be transferred to the second device.

20. The first device of claim 14, wherein the at least one encrypted content piece is removed by the first device when the second device does not have rights to access all of the encrypted content pieces in the media storage structure.

* * * * *